(12) United States Patent
Galitzky (10) Patent No.: US 12,487,685 B1
(45) Date of Patent: Dec. 2, 2025

(54) CUSTOM PROGRAMMABLE KEYBOARD WITH ADVANCED MACRO CAPABILITIES

(71) Applicant: Leon Galitzky, Nesher (IL)

(72) Inventor: Leon Galitzky, Nesher (IL)

( * ) Notice: Subject to any disclaimer, the term of this patent is extended or adjusted under 35 U.S.C. 154(b) by 0 days.

(21) Appl. No.: 18/940,522

(22) Filed: Nov. 7, 2024

(51) Int. Cl.
*G06F 3/023* (2006.01)
*G06F 3/02* (2006.01)

(52) U.S. Cl.
CPC .............. *G06F 3/0238* (2013.01); *G06F 3/021* (2013.01)

(58) Field of Classification Search
CPC ................................. G06F 3/0238; G06F 3/021
See application file for complete search history.

(56) References Cited

U.S. PATENT DOCUMENTS

| | | | |
|---|---|---|---|
| 4,200,913 A | 4/1980 | Kuhar et al. | |
| 4,547,860 A | 10/1985 | Lapeyre | |
| 4,823,311 A | 4/1989 | Hunter et al. | |
| 5,387,042 A | 2/1995 | Brown | |
| 2002/0015609 A1 | 2/2002 | Webber | |
| 2002/0154097 A1 | 10/2002 | Chen | |
| 2003/0201971 A1 | 10/2003 | Iesaka | |
| 2003/0201982 A1* | 10/2003 | Lesaka | G06F 3/0213 345/168 |
| 2004/0036632 A1 | 2/2004 | Ford | |
| 2004/0066374 A1 | 4/2004 | Holloway et al. | |
| 2005/0057517 A1* | 3/2005 | Rix | G06F 3/0238 345/168 |
| 2006/0284846 A1* | 12/2006 | Pate | G06F 3/1423 345/168 |
| 2007/0285393 A1 | 12/2007 | Ishakov | |
| 2009/0116892 A1* | 5/2009 | Ahn | G06F 3/0219 400/489 |
| 2009/0251417 A1* | 10/2009 | Pate | G06F 3/0238 345/168 |
| 2011/0175811 A1* | 7/2011 | Edmister | G06F 3/021 345/161 |

(Continued)

FOREIGN PATENT DOCUMENTS

| | | |
|---|---|---|
| KR | 20020041248 A | 6/2002 |
| KR | 20110027930 A | 3/2011 |

(Continued)

*Primary Examiner* — Afroza Chowdhury
(74) *Attorney, Agent, or Firm* — Knobbe, Martens Olson & Bear, LLP (57) ABSTRACT

A multifunctional keyboard may include a platform. A multifunctional keyboard may include at least one mechanical actuator disposed on the platform, the at least one mechanical actuator configured to move between a first position and a second position, when the at least one mechanical actuator is in the first position, the keyboard is in a macro configuration and when the at least one mechanical actuator is in the second position, the keyboard is in a text input configuration. A multifunctional keyboard may include a first plurality of keys disposed on the platform, each of the first plurality of keys corresponding to a different macro layer when the keyboard is in the macro configuration. A multifunctional keyboard may include a second plurality of keys disposed on the platform, each of the second plurality of keys corresponding to a different macro for each macro layer selected by the first plurality of keys.

20 Claims, 1 Drawing Sheet

(56) References Cited

U.S. PATENT DOCUMENTS

| | | | | |
|---|---|---|---|---|
| 2012/0023268 A1* | 1/2012 | Huang | ............... | G06F 3/0238 |
| | | | | 710/18 |
| 2012/0194546 A1* | 8/2012 | Ibsies | ................... | G06F 3/0219 |
| | | | | 345/629 |
| 2013/0067126 A1* | 3/2013 | Casparian | ............ | G06F 3/0238 |
| | | | | 710/73 |
| 2016/0100465 A1* | 4/2016 | Prescott | ............... | G06F 3/0219 |
| | | | | 345/170 |
| 2021/0081057 A1 | 3/2021 | Potts | | |
| 2022/0005653 A1 | 1/2022 | Brisbee et al. | | |

FOREIGN PATENT DOCUMENTS

| | | |
|---|---|---|
| KR | 20110130616 A | 12/2011 |
| KR | 20180047770 A | 5/2018 |

\* cited by examiner

CUSTOM PROGRAMMABLE KEYBOARD WITH ADVANCED MACRO CAPABILITIES

BACKGROUND

In a growing number of industries, a substantial amount of work is accomplished with the help of computers. Using a keyboard to input data or to accomplish tasks can often be inefficient especially when accomplishing tasks that are repeated frequently. In the medical community, practitioners may type out medical diagnostics that are similar to another diagnostic made earlier. Having to type out each diagnostic is inefficient and results in a waste of the practitioner's time. In tech support, a staff member can make changes such as installing programs, changing computer properties, changing program settings with minimal keystrokes. This allows the tech support to save time while taking control over the computer remotely and performing a repeated action on numerous users/computers.

There exists a need for a keyboard which provides a user greater flexibility, which allows a user to choose how the keyboard functions and which is able to execute longer commands with minimum keystrokes.

SUMMARY

In some aspects, the techniques described herein relate to a multifunctional keyboard, including: a platform; at least one mechanical actuator disposed on the platform, the at least one mechanical actuator configured to move between a first position and a second position, when the at least one mechanical actuator is in the first position, the keyboard is in a macro configuration and when the at least one mechanical actuator is in the second position, the keyboard is in a text input configuration; a first plurality of keys disposed on the platform, each of the first plurality of keys corresponding to a different macro layer when the keyboard is in the macro configuration; and a second plurality of keys disposed on the platform, each of the second plurality of keys corresponding to a different macro for each macro layer selected by the first plurality of keys.

In some embodiments, a plurality of mechanical actuators are disposed on the platform.

In some embodiments, the at least one mechanical actuator includes at least one handle.

In some embodiments, the at least one mechanical actuator includes at least one joystick.

In some embodiments, the at least one mechanical actuator includes at least one toggle switch.

In some embodiments, the macro layer corresponding to at least one key of the first plurality of keys includes a set of medical diagnostic descriptions.

In some embodiments, the macro corresponding to at least one key of the second plurality of keys includes a medical diagnostic description associated with the set of medical diagnostic descriptions.

In some embodiments, the macro corresponding to at least one key of the second plurality of keys is configured to execute at least one of: install programs on a connected user device, change properties of the connected user device, or change program settings.

In some embodiments, the functionality of the first or second plurality of keys is programmable by a user, such that the function or value corresponding to each key within the first or second plurality of keys can be set by the user.

In some embodiments, the function or value of each key includes at least one of the following: a set of medical diagnostic descriptions, a subset of medical diagnostic descriptions, or a medical diagnostic description.

In some embodiments, the multifunctional keyboard further includes a third plurality of keys disposed on the platform. In some embodiments, the third plurality of keys includes system operational keys.

In some embodiments, each key of the first plurality of keys includes a backlight.

In some embodiments, the backlight of each key of the first plurality of keys includes a backlight of a different color than each other key of the first plurality of keys.

In some embodiments, the second plurality of keys are illuminated, an illumination color of the second plurality of keys corresponding to a color of the backlight of a selected key in the first plurality of keys.

In some embodiments, the first plurality of keys includes 30 keys.

In some embodiments, the second plurality of keys includes 108 keys.

In some embodiments, the second plurality of keys is located proximate a first horizontal end of the platform.

In some embodiments, the first plurality of keys is located closer to a second horizontal end of the platform than the second plurality of keys.

In some embodiments, the techniques described herein relate to a multifunctional keyboard. In some embodiments, the at least one mechanical actuator is located between the first plurality of keys and the second plurality of keys.

In another aspect, a multifunctional keyboard is disclosed. The keyboard includes a platform; a pointing device disposed on the platform, the pointing device configured to move a cursor on a display electrically connected to the keyboard; a first plurality of keys disposed on the platform, each of the first plurality of keys corresponding to a different macro layer; a second plurality of keys disposed on the platform, each of the second plurality of keys corresponding to a different macro for each macro layer selected by the first plurality of keys; a memory device within the platform configured to record position data, movement data, and interaction data of the cursor controlled by the pointing device.

In some embodiments, at least one key of the of the first, second, or third plurality of keys is configured to interact with the cursor causing the cursor to interact with the display connected to the keyboard.

In some embodiments, the pointing device includes a mouse pad.

In some embodiments, the pointing device includes a roller configured to rotate when a user interacts with the roller. In some embodiments, the rotational movement of the roller is configured to cause the cursor to move across the display.

In some embodiments, the pointing device includes a joystick.

In some embodiments, at least one macro associated with a key of the second plurality of keys is associated with at least a portion of the position data, movement data, or interaction data stored within the memory device.

In some embodiments, the at least one macro associated with the key of the second plurality of keys is configured to cause the cursor to move or interact with a display connected to the keyboard in accordance with the position data, movement data, or interaction data associated with the at least one macro.

In another aspect, a multifunctional keyboard is disclosed. The keyboard includes: a platform; a mode-changing device configured to change the mode of the keyboard; a first plurality of keys disposed on the platform, each of the first plurality of keys corresponding to a different macro layer; a second plurality of keys disposed on the platform, each of the second plurality of keys corresponding to a different macro for each macro layer selected by the first plurality of keys; and a memory device stored within the platform, the memory device configured to store software related to the keyboard's functionality. In some embodiments, the software is configured allow a computer or other device connected to the keyboard to communicate with the keyboard without the software being installed on the computer or other device.

In some embodiments, the platform includes a port configured to receive an external memory device.

In some embodiments, the functionality of the first or second plurality of keys is configured to change based on the data stored on the external memory device when connected to the port of the platform.

In some embodiments, the mode-changing device includes a third plurality of keys, each key of the third plurality of keys corresponding to a different mode of the keyboard.

In some embodiments, the mode-changing device includes at least one mechanical actuator configured to move between a plurality of position, each position corresponding to a different mode of the keyboard.

BRIEF DESCRIPTION OF THE DRAWINGS

The detailed description is set forth with reference to the accompanying figures. The use of the same numbers in different figures indicates similar or identical items.

For this discussion, the devices and systems illustrated in the figures are shown as having a multiplicity of components. Various implementations of devices and/or systems, as described herein, may include fewer components, and remain within the scope of the disclosure. Alternatively, other implementations of devices and/or systems may include additional components, or various combinations of the described components, and remain within the scope of the disclosure.

DETAILED DESCRIPTION OF THE PREFERRED EMBODIMENT

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Furthermore, embodiments of the development may include several novel features, no single one of which is solely responsible for its desirable attributes or which is essential to practicing the invention described herein.

Figure 1:
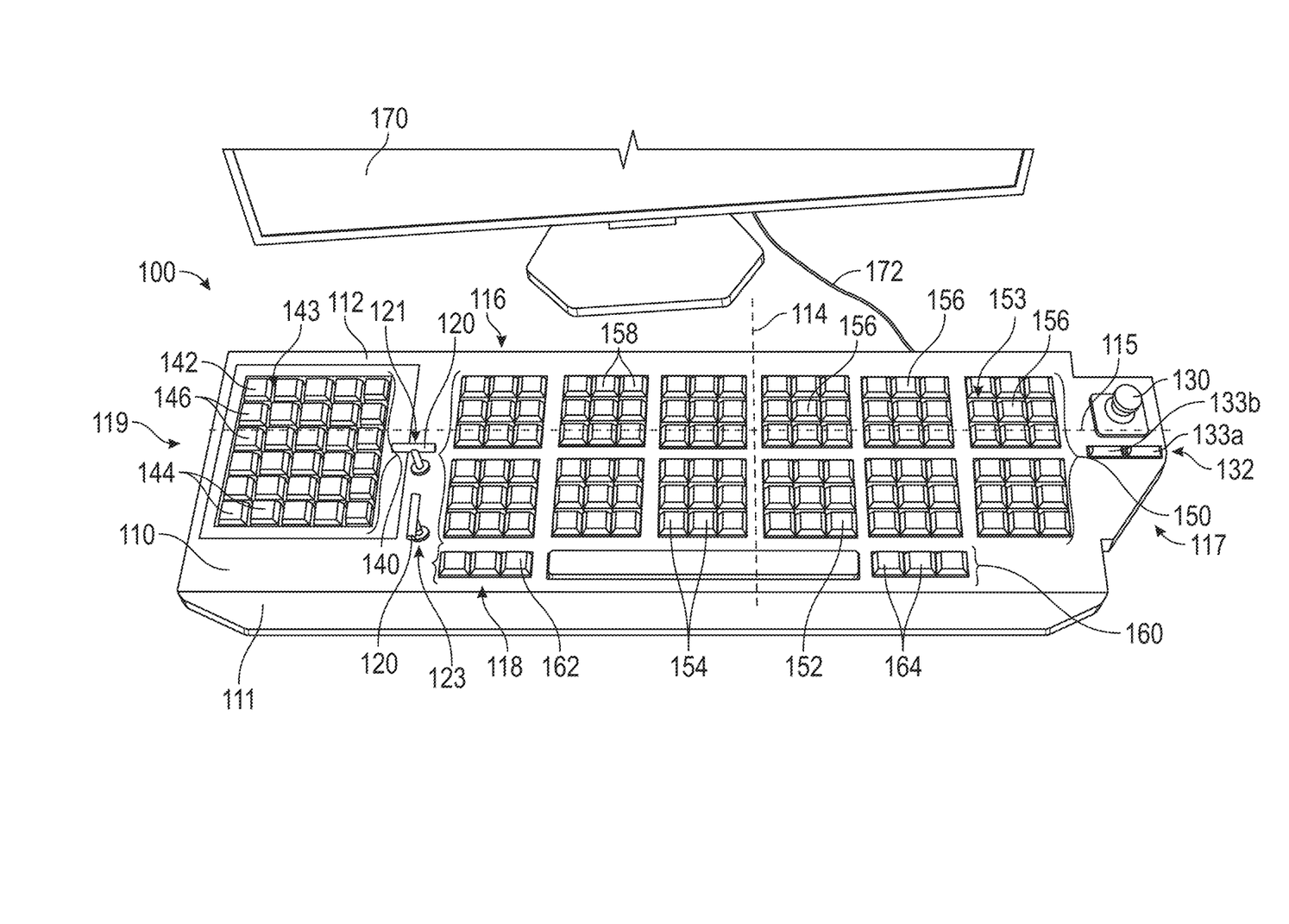
FIG. 1 depicts a top view of multifunctional keyboard.

FIG. 1 shows a top view of a multifunctional keyboard. As seen in FIG. 1, the keyboard 100 includes a platform 110, a mechanical actuator 120, a pointing device 130, a first plurality of keys 140, and a second plurality of keys 150.

As seen in FIG. 1, the platform 110 may be mostly rectangular in shape. The platform 110 may be composed of a plastic or composite material. In some embodiments, the platform 110 is composed of a metal. The platform has a front face 112 and a back face (not seen). In some embodiments, the back face of the platform 110 is flat and is configured to be placed on a surface. In some embodiments, the platform 110 has a thickness that is the same or substantially the same along a width 114 of the platform 110. In some embodiments, the platform 110 has a thickness that is different along the width 114 of the platform 110. In some embodiments, the thickness of the platform 110 is larger proximate a top end 116 of the platform compared to the thickness of the platform 110 proximate a bottom end 118 of the platform. This configuration beneficially angles the front face 112 of the platform 110, thereby allowing easier interaction by a user with the keyboard 100. In some embodiments, the back face of the platform includes stands that causes the first end of the platform 110 to be elevated relative to the second end of the platform 110.

In some embodiments, the platform 110 includes a shelf 111. The shelf 111 may be connected to the bottom end 118 of the platform 110. In some embodiments, the shelf 111 is integrally formed with the platform 110 of the keyboard. In some embodiments, the shelf 111 has a thickness that is smaller than the thickness of the platform 110 at the bottom end 118 of the platform 110.

In some embodiments, the keyboard 100 includes a local memory. The local memory is disposed within the interior of the platform 110. The local memory may take the form of Read-Only Memory (ROM), Electrically Erasable Programmable Read-Only Memory (EEPROM), flash memory, Random-Access Memory (RAM), Static Random-Access Memory (SRAM), Dynamic Random-Access Memory (DRAM), a Hard Disk Drive (HDD), a Solid-State Drive (SSD), or other type of memory. The local memory is configured to store data, such as macro layers, macros, user interactions, and other forms of data described in more detail below. In some embodiments, the local memory has software and/or firmware stored within related to the functionality of the keyboard 100. This software and/or firmware is configured to allow the keyboard 100 to function when connected to a computer or other device without the software and/or firmware being downloaded or uploaded to the computer or other device.

The keyboard 100 also includes at least one mechanical actuator 120. In some embodiments, the at least one mechanical actuator 120 is a toggle switch, a joystick, a handle or other mechanical actuator. In some embodiments, the mechanical actuator 120 is located centrally along a width 114 of the platform 110. In some embodiments, the mechanical actuator 120 may be located along the width 114 of the platform 110 such that the mechanical actuator 120 is located closer to a top end 116 of the platform than to the bottom end 118 of the platform 110. In some embodiments, the mechanical actuator 120 may be located along the width 114 of the platform 110 such that the mechanical actuator 120 is located closer to a bottom end 118 of the platform than the top end 116 of the platform 110.

The mechanical actuator 120 is configured to change the mode of the keyboard 100. In some embodiments, the mechanical actuator 120 is configured to be moved between a plurality of positions, each position corresponding to a different mode of the keyboard 100. In some embodiments, the modes include a macro mode and a text input mode. In some embodiments, the value or function of the first and second plurality of keys as described below is changed based on whether the keyboard 100 is in the macro mode or in the text input mode. In some embodiments, the mechanical actuator 120 is configured to be moved in a first direction and a second direction. In some embodiments, the when the mechanical actuator 120 is moved in the first direction, the mode of the keyboard 100 is set to the macro mode and when the mechanical actuator 120 is moved in a second direction the keyboard 100 is set to the text input mode.

In some embodiments, the mechanical actuator 120 is configured to be rotated between a first position 121 and second position 123. In some embodiments, when the mechanical actuator 120 is in the first position 121, the keyboard 100 is set to the macro mode and when the mechanical actuator 120 is in the second position 123, the keyboard 100 is set to the text input mode.

In some embodiments, the mechanical actuator 120 is configured to be toggled between a first and a second configuration. In some embodiments, when the mechanical actuator 120 is in the first configuration, the keyboard 100 is set to the macro mode and when the mechanical actuator 120 is in the second configuration, the keyboard 100 is set to the text input mode.

In some embodiments, the keyboard 100 includes a plurality of mechanical actuators. In some embodiments, a first actuator of the plurality of actuators is configured to change the mode of the keyboard 100 in a similar manner to the mechanical actuator 120 as described above. In this embodiment, a second actuator or a subset of the plurality of mechanical actuators is configured to change the macro layer of the keyboard. In some embodiments, the second actuator or subset of actuators is configured to move between a plurality of positions, each position of the mechanical actuator corresponding to a different macro layer of the keyboard 100. In some embodiments, each macro layer may include macros suited for a particular application. In some embodiments, the macro layers include a macro layer for medical applications, a macro layer for programming applications, a macro layer for tech support and/or a macro layer for gaming applications. In some embodiments, the macro layer designed for medical applications includes a set of medical diagnostics.

In some embodiments, the keyboard 100 also includes a pointing device 130. In some embodiments, the pointing device 130 is located proximate a first horizontal end 117 along a length 115 of the platform 110. In some embodiments, the pointing device 130 is a joystick, a roller, or a touchpad. In some embodiments, the pointing device 130 is configured to interact with a display, computer, or other device connected to the keyboard 100. In some embodiments, the pointing device 130 is configured to interact with a cursor displayed on a monitor 170 or similar display connected to the keyboard 100, thereby allowing a user to control and/or interact with the cursor by means of the pointing device 130. In some embodiments, the pointing device 130 is configured to move in a plurality of directions. In some embodiments, movement of the pointing device 130 causes a cursor displayed on a monitor 170 connected to the keyboard 100 to move, the movement of the cursor corresponding, at least partially, to the movement of the pointing device 130.

In some embodiments, the keyboard 100 also includes pointing device keys 132. The pointing device keys 132 may be configured to cause the cursor to interact with a monitor 170. In some embodiments, the pointing device keys include two keys, a first key 133a and a second key 133b. In some embodiments, actuating the first key 133a causes the cursor to interact with a monitor 170 connected to the keyboard 100 in a manner similar or equivalent to a right-click. In some embodiments, actuating the second key 133b causes the cursor to interact with a monitor 170 connected to the keyboard 100 in a manner similar or equivalent to a left-click. In some embodiments, the pointing device keys 132 includes more than two keys. In some embodiments, the pointing device keys 132 includes only one key.

The first plurality of keys 140 is disposed on the platform 110. In some embodiments the first plurality of keys 140 is located on the platform 110 proximate a second horizontal end 119 along the length 115 of the platform 110. In some embodiments, the first plurality of keys 140 is located between the second horizontal end 119 of the platform 110 and the mechanical actuator 120. In some embodiments, the first plurality of keys 140 are disposed on the platform 110 in a 5×6 configuration, resulting in a total of 30 keys. In some embodiments, the first plurality of keys 140 may be disposed on the platform in a different configuration resulting in the same or a different number of keys 146. In some embodiments, the first plurality of keys 140 may include 5, 10, 15, 20, 25, 30, 40, 50, 60, 70, 80, 90, 100 or more keys. In some embodiments, the first plurality of keys 140 includes a number of keys between the numbers recited above. In some embodiments, the first plurality of keys 140 is constructed from a durable material, such as a plastic or a composite material, to withstand repeated pressing.

Each key 146 of the first plurality of keys 140 includes a top face 142 which is a generally planar surface and side faces 144. The top face 142 may display one or more indicia (e.g., a letter, number, symbol, or icon) to indicate the function of the key 146. In some embodiments, the side faces 144 are angled such that the cross section of each key 146 is generally trapezoidal. In some embodiments, the side faces 144 form right angles with the top face 142 resulting in the cross section of each key 146 being generally rectangular.

In some embodiments, the first plurality of keys 140 are attached to the platform 110 such that that each key 146 is prevented from rotating or becoming misaligned during use. In some embodiments, the platform 110 includes guide rails or posts that ensure smooth vertical movement as each key 146 is pressed and released.

Additionally, each key 146 of the first plurality of keys 140 is connected to a return mechanism, such as a spring or membrane, that biases the key 146 to its original, unpressed position after being pressed by a user. This return mechanism ensures that the key 146 can be pressed multiple times with consistent tactile feedback.

Each key 146 of the first plurality of keys 140 is affixed to a switch mechanism that controls the electrical signal sent to the device in response to the key 146 being actuated by a user. In some embodiments, the switch mechanism consists of a dome switch, though it may also include mechanical, scissor, or capacitive switches, depending on the intended application.

In some embodiments, a light source 143 is located beneath or adjacent to each key 146 of the first plurality of keys 140. The light source 143 is configured to act as a backlight, illuminating the area around each key 146. In some embodiments, the light source 143 may be, but is not limited to, a light emitting diode (LED), an organic light emitting diode (OLED), an MID light source, a laser diode, a quantum dot, a remote phosphor LED, or other type of illumination source. In some embodiments, the light source 143 is an RGB LED. Each RGB LED is capable of emitting a range of colors by varying the intensities of the red, green, and blue light-emitting diodes. In some embodiments, each key 146 of the first plurality of keys 140 is illuminated with a different color, such that no two keys of the first plurality of keys 140 is illuminated with the same color. In some embodiments, the color of each key 146 is programmable by the user. In some embodiments, each key 146 of the first plurality of keys 140 is made with a material that is at least partially translucent, thereby allowing a portion of the light emitted by the light source 143 to pass through the key 146 itself.

The value or function of each key 146 of the first plurality of keys 140 is configured to change based on whether the keyboard 100 is in the macro mode or in the text input mode. In some embodiments, when the keyboard 100 is in the macro mode, each key 146 of the first plurality of keys 140 is associated with a macro layer. Each macro layer may include a plurality of macros associated with the macro layer. When the keyboard 100 is in the macro mode, a user may actuate a key 146 of the first plurality of keys 140, thereby activating the macro layer associated with the key 146 actuated. When the user desires to change the activated macro layer of the keyboard 100, the user may actuate a different key of the first plurality of keys 140 causing the macro layer associated with actuated different key to become activated. In some embodiments, when the user actuates a key 146 of the first plurality of keys 140 the settings of software being run by a user device connected to the keyboard 100 and/or settings of the user device itself may be altered. In some embodiments, the macro layer associated with a key 146 of the first plurality of keys 140 includes macros that are configured to alter the settings of software installed on a user device connected to the keyboard 100 and/or the settings of the user device itself. In some embodiments, when the user actuates a key 146 of the first plurality of keys 140 software may be installed or removed from a user device connected to the keyboard 100. In some embodiments, the macro layer associated with a key 146 of the first plurality of keys 140 includes macros that are configured to install and/or remove software on and/or from a user device connected to the keyboard 100. In some embodiments, a user may be able to customize the settings of software or the user device that are altered by each key 146 when actuated by a user.

The function or value of each key 146 within the first plurality of keys 140 is fully customizable by a user, such that the user can assign a macro layer to a key 146 within the first plurality of keys 140. The user is able to customize each macro layer such that the user can choose and assign different macros to be assigned to each macro layer. In some embodiments, the macro layers include a macro layer for medical applications, a macro layer for programming applications, a macro layer for tech support and/or a macro layer for gaming applications. In some embodiments, the macro layer designed for medical applications includes a set of medical diagnostics.

In some embodiments, a user is able to customize the macro layers associated with the first plurality of keys 140. In some embodiments, the user may create different macro layers by interacting with the keyboard 100 or keyboard software. In some embodiments, the user may create a macro layer by grouping a plurality of macros together. In some embodiments, the function or value of the first plurality of keys 140 is customizable by a user such that the user can assign a desired macro layer to a desired key of the first plurality of keys 140. This beneficially allows a user greater flexibility while using the keyboard 100, the keyboard 100 is programmable such that a user can create any desired number of macro layers and assign each layer to a key 146 of the first plurality of keys 140. If a previously used macro layer becomes unnecessary for the user's intentions, the user can replace the previously used macro layer with a new macro layer that is more suited to the user's needs.

In some embodiments, when the keyboard 100 is in the text input mode, the first plurality of keys 140 may include number keys, letter keys, and/or system keys.

The second plurality of keys 150 is disposed on the platform 110. In some embodiments, the second plurality of keys 150 is located on the platform between the first plurality of keys 140 and a first horizontal end 117 of the platform 110. In some embodiments, the second of plurality of keys 150 is disposed on the platform 110 in a single block, such as a 6×18 configuration, thereby resulting in a total of 108 keys. In some embodiments, the second plurality of keys 150 is disposed on the platform in a plurality of key blocks 156, such as 12 key blocks each in a 3×3 configuration, resulting in a total of 108 keys. In some embodiments, the second plurality of keys 150 is disposed in a different configuration resulting in the same or a different number of keys and/or key blocks 156. In some embodiments, the second plurality of keys 150 includes 1, 2, 3, 4, 5, 10, 15, 20 or more key blocks 156. In some embodiments, the second plurality of keys 150 may include 5, 10, 15, 20, 25, 30, 40, 50, 60, 70, 80, 90, 100, 120, 150, 175, 200 keys or more. In some embodiments, the second plurality of keys 150 includes a number of keys or key blocks 156 between the numbers recited above. In some embodiments, the second plurality of keys 150 is constructed from a durable material, such as a plastic or a composite material, to withstand repeated pressing.

Each key 158 of the second plurality of keys 150 includes a top face 152 which is a generally planar surface and side faces 154. The top face 152 may display one or more indicia (e.g., a letter, number, symbol, or icon) to indicate the function of the key 158. In some embodiments, the side faces 154 are angled such that the cross section of each key 158 is generally trapezoidal. In some embodiments, the side faces 154 form right angles with the top face 152 resulting in the cross section of each key 158 being generally rectangular.

Each key 158 is attached to the platform 110 such that that the key 158 is prevented from rotating or becoming misaligned during use. In some embodiments, the platform 110 includes guide rails or posts that ensure smooth vertical movement as the key 158 is pressed and released.

Additionally, each key 158 of the second plurality of keys 150 is connected to a return mechanism, such as a spring or membrane, that biases the key 158 to its original, unpressed position after being pressed by a user. This return mechanism ensures that the key 158 can be pressed multiple times with consistent tactile feedback.

Each key 158 of the second plurality of keys 150 is affixed to a switch mechanism that controls the electrical signal sent to the device in response to the key 158 being actuated by a user. In some embodiments, the switch mechanism consists of a dome switch, though it may also include mechanical, scissor, or capacitive switches, depending on the intended application.

In some embodiments, a light source 153 is located beneath or adjacent to each key 158 of the second plurality of keys 150. The light source 153 is configured to act as a backlight, illuminating the area around each key. In some embodiments, the light source 153 may be, but is not limited to, a light emitting diode (LED), an organic light emitting diode (OLED), an MID light source, a laser diode, a quantum dot, a remote phosphor LED, or other type of illumination source. In some embodiments, the light source 153 is an RGB LED. Each RGB LED is capable of emitting a range of colors by varying the intensities of the red, green, and blue light-emitting diodes. In some embodiments, the second plurality of keys 150 is illuminated with the same color, the color corresponding to the color of a key 146 of the first plurality of keys 140. In some embodiments, when the keyboard 100 is in macro mode, the second plurality of keys 150 are illuminated with the same color as the most recently actuated key of the first plurality of keys 140 thereby indicating to a user which macro layer is currently in place. In some embodiments, when the keyboard 100 is in the text input mode, the second plurality of keys 150 is illuminated with a color that does not correspond to a key 146 of the first plurality of keys 140, thereby indicating to a user that the keyboard 100 is in the text input mode.

In some embodiments, each key 158 of each key block 156 is illuminated with the same color thereby resulting in all the key blocks 156 being illuminated with a single color. In some embodiments, a subset of the key blocks 156 may be illuminated with a different color. In some embodiments, a subset of the keys within a key block 156 may be illuminated with a different color.

In some embodiments, the color of each key 158 or key block 156 of the second plurality of keys 150 is programmable by the user. In some embodiments, each key 158 of the second plurality of keys 150 is made with a material that is at least partially translucent, thereby allowing a portion of the light emitted by the light source 153 to pass through the key 158 itself.

The function or value of each key 158 within the second plurality of keys 150 is configured to change depending on whether the keyboard 100 is in the macro mode or in the text input mode. In some embodiments, when the keyboard 100 is in the macro mode, each key 158 within the second plurality of keys 150 may be associated with a different macro within the plurality of macros associated with a macro layer. In some embodiments, each macro may include a sequence of commands or instructions that are grouped together as single commend to automate repetitive tasks. In some embodiments, each macro may include keystrokes of any keys of the keyboard 100. In some embodiments, each macro may include interactions of the user with the pointing device 130, including, but not limited to, the position and/or movement of a cursor controlled by the pointing device 130. In some embodiments, each macro includes interaction of the cursor with a displayed screen, such as a click executed via the first pointing device key 133*a* or second pointing device key 133*b*. In some embodiments, the macros may be configured to interact with a software installed on a user device connected, either wirelessly or wired, to the keyboard 100, such as opening a software program, interacting with a feature of the software, or installing programs or software. In some embodiments, the macros are configured to interact with and/or alter the settings of software being run by a user device connected to the keyboard 100 and/or settings of the user device itself. In some embodiments, the macros may be configured to install and/or remove software a user device connected to the keyboard 100. In some embodiments, the keyboard 100 may be connected directly or indirectly to the user device. In some embodiments, the keyboard 100 may be connected remotely to a user device. In some embodiments, the macros may be configured to interact with a user device connected to the keyboard 100, such as a computer. In some embodiments, the settings that are altered by a macro may be programmed by the user, such that the user can customize which settings are altered and to what degree they are altered. In some embodiments, each macro may include a medical diagnostic description.

When the keyboard 100 is in the macro mode, a user may actuate a key 146 of the first plurality of keys 140 thereby activating the macro layer associated with the actuated key. Upon the key 146 being actuated, the illumination color of the second plurality of keys 150 may change to match the illumination color of the actuated key from the first plurality of keys 140 and the function or value of each key 158 of the second plurality of keys 150 may change to correspond to a macro within the plurality of macros of the macro layer associated with the actuated key as programmed by the user. The user may then actuate a desired key of the second plurality of keys 150 thereby causing the keyboard 100 to execute the macro assigned to the actuated key. The keyboard 100 may then execute the commands or instructions that make up the macro. Each key 158 of the second plurality of keys 150 may be actuated in this way, resulting in each macro associated with each key 158 actuated to be executed.

The function or value of each key 158 within the second plurality of keys 150 is fully customizable by a user, such that the user can assign a macro to a key 158 within the second plurality of keys 150. In some embodiments, the user is able to customize the macro associated with the second plurality of keys 150 by uploading the macro to an external memory and downloading the desired macro layers to a local memory of the keyboard 100 through a port on the keyboard 100 holding the external memory.

In some embodiments, the user can assign macros to keys 158 within the second plurality of keys 150 based on the relative position of each key 158 of the second plurality of keys 150. In some embodiments, the macros may be assigned to a key 158 based on the relative horizontal position of the key 158 along length 115 of the platform 110, such that keys 158 in the same horizontal position are assigned macros of a similar nature. In some embodiments, the macros may be assigned to a key 158 based on the relative vertical position of the key 158 along the width 114 of the platform 110, such that keys 158 in the same vertical position are assigned macros of a similar nature. In some embodiments, the macros may be assigned to a key 158 based on the relative position of the key 158 within a key block 156 of the platform 110, such that keys 158 in the same position within each key block 156 are assigned macros of a similar nature. This configuration beneficially allows the user to assign and macros within a three dimensional like space formed by the horizontal position, vertical position, and position with the key block 156 of each key 158 of the second plurality of keys 150.

In some embodiments, when the keyboard 100 is in the text input mode, the value of function of the second plurality of keys 150 may change to include letter keys, number keys and/or system keys.

In some embodiments, the keyboard 100 may include a third plurality of keys 160. The third plurality of keys 160 is disposed on the platform 110. In some embodiments the third plurality of keys 160 is located on the platform 110 proximate a bottom end 118 of the platform 110. In some embodiments, the third plurality of keys 160 is located between the bottom end 118 of the platform 110 and the second plurality of keys 150. In some embodiments, the third plurality of keys 160 is constructed from a durable material, such as a plastic or a composite material, to withstand repeated pressing.

Each key of the third plurality of keys 160 includes a top face 162 which is a generally planar surface and side faces 164. The top face 162 may display one or more indicia (e.g., a letter, number, symbol, or icon) to indicate the function of the key. In some embodiments, the side faces 164 are angled such that the cross section of each key is generally trapezoidal. In some embodiments, the side faces 164 form right angles with the top face 162 resulting in the cross section of each key being generally rectangular.

In some embodiments, the third plurality of keys 160 are attached to the platform 110 such that that each of the third plurality of keys 160 are prevented from rotating or becoming misaligned during use. In some embodiments, the platform 110 includes guide rails or posts that ensure smooth vertical movement as each of the third plurality of keys 160 are pressed and released.

Additionally, each key of the third plurality of keys 160 is connected to a return mechanism, such as a spring or membrane, that biases the key to its original, unpressed position after being pressed by a user. This return mechanism ensures that the key can be pressed multiple times with consistent tactile feedback.

Each key of the third plurality of keys 160 is affixed to a switch mechanism that controls the electrical signal sent to the device in response to the key being actuated by a user. In some embodiments, the switch mechanism consists of a dome switch, though it may also include mechanical, scissor, or capacitive switches, depending on the intended application.

In some embodiments, the third plurality of keys 160 includes a space bar and system keys, such as a crtl key and/or an alt key. In some embodiments, the third plurality of keys 160 includes at least one key that is configured to adjust the settings of software installed on a user device connected to the keyboard 100 and/or the settings of the user device itself. In some embodiments, the settings that are altered by the actuation of a key of the third plurality of keys 160 may be programmed by the user, such that the user can customize which settings are altered and to what degree they are altered.

In some embodiments, the third plurality of keys 160 may include a macro recording button. In some embodiments, the macro recording button is configured to record keystrokes and/or pointing device interactions carried out by a user and copy the keystrokes and/or interactions to the local memory of the keyboard 100. In some embodiments, after the user actuates the macro-recording button, any keystrokes completed by the user and any interactions with the pointing device 130 carried out by the user, such as the position or movement of the cursor via the pointing device 130 and/or interactions with a monitor 170 via the pointing device keys 132. In some embodiments, the keystrokes and/or interactions with the keyboard 100 are recorded until the user actuates the macro-recording device for a second time. In some embodiments, after the recorded keystrokes and interactions are copied to the local memory, the user may assign the recorded material to a macro layer and/or a chosen key of the second plurality of keys 150 as a macro. Subsequently when the keyboard 100 is in macro mode, actuating the chosen key of the second plurality of keys 150 when the appropriate macro layer is activated causes the keyboard 100 to execute the macro thereby reproducing all of the recorded material by replicating the recorded keystrokes and/or interactions. In some embodiments, the keyboard 100 reenacts the recorded material in a faster time than the time taken to record the material initially.

In some embodiments, the first plurality of keys 140 or second plurality of keys 150 includes a macro-recording key.

In some embodiments, the keyboard 100 includes a first port (not shown in FIG. 1) that is configured to receive an external memory. In some embodiments, the first port is configured to receive an electrical connection that is also connected to the external memory. In some embodiments, the external memory is a Hard Disk Drive (HDD), a Solid-State Drive (SSD), a flash drive, a memory card, such as but not limited to, a SD card, a microSD cards, etc., optical discs, or other types of external memory. In some embodiments, the keyboard 100 includes hardware that is configured to read the external memory and/or copy the contents of the connected external memory to a local memory of the keyboard 100. In some embodiments, a user may upload customizations, such as macro layers and/or macros created by the user, to the function or value of the first plurality of keys 140 and/or second plurality of keys 150 to the external memory. The external memory can then be connected to the keyboard 100. The keyboard 100 can then read and assign the values and/or functions of the first plurality of keys 140 and/or second plurality of keys 150 to those contained on the external memory as directed by a user.

In some embodiments, the keyboard 100 includes a second port configured to receive a programming external device. In some embodiments, the second port may be a USB port, a HDMI port, a DisplayPort, or other type of port. In some embodiments, the programming external device may be configured to program the function or values of the keys of the keyboard 100, including the first plurality of keys 140, the second plurality of keys 150 and the third plurality of keys 160. In some embodiments, the programming external device is configured to record macros based at least partially on an input or inputs from a user. In some embodiments, the programming external device is configured to create macro layers composed of a plurality of macros based at least partially on an input or inputs from a user. In some embodiments, the programming external device is configured to assign macro layers to keys 146 of the first plurality of keys 140 based at least partially on an input or inputs received from a user. In some embodiments, the programming external device is configured to assign macros to keys 158 of the second plurality of keys 150 based at least partially on an input or inputs received from a user. In some embodiments, the external programming device may include a monitor and a pointing device (such as a mouse).

In some embodiments, the keyboard 100 also includes an electrical connection 172. The electrical connection 172 may be configured to be connected to a user device, such as a monitor 170, a computer, or other device. In some embodiments, the keyboard 100 is configured to receive electrical power from the user device through the electrical connection 172. In some embodiments, the keyboard 100 is configured to send and/or receive electrical signals through the electrical connection 172, thereby by allowing the keyboard to interact with the user device. In some embodiments, the keyboard 100 may include hardware, such as a local area communications module or a wide area communications module, that allows the keyboard 100 to connect to and communicate with a user device wirelessly. In this configuration, the keyboard 100 may include a power supply within the platform 110.

In some embodiments, the keyboard 100 may be connected directly to a user device, for example, by way of the electrical connection 172 as described above. In some embodiments, the keyboard 100 may be connected remotely or indirectly to a user device. In some embodiments, a user device may include, but is not limited to, a computer, monitor, laptop, tablet, smartphone, smartwatch, mouse, game controller, microphone, speaker, headphones, webcam, camera, television, display, printer, scanner, fax machine, gaming console, drone, or other user device.

The keyboard 100 as described herein beneficially gives a user greater control and flexibility over how the keyboard 100 functions. In some embodiments, the keyboard 100 gives the user access to 3240 different macros with only two keystrokes, a first keystroke to choose a macro layer by actuating a key 146 of the first plurality of keys 140 and a second keystroke to execute the desired macro by actuating a key 158 of the second plurality of keys 150. As described herein, the keyboard 100 is also fully programmable by the user such that user can create and/or assign desired macros and macro layers to suit the user's intended purpose.

A programmable keyboard 100 as described herein may be utilized in any number of industries or to accomplish a variety of tasks. For example, the macro layers and/or macros as described herein may be configured to insert, delete, or edit lines of codes. In some embodiments, the macro layers and/or macros as described herein may be configured to convert text into a specific syntax compatible with a programming language. In some embodiments, the macro layers and/or macros as described herein may be configured to debug lines of code. These features beneficially allow a user to use the keyboard 100 for programming purposes.

In some embodiments, the macro layers and/or macros as described herein may be configured to retrieve data from a network entity, from a local memory of the keyboard 100, from a local memory of a user device in communication with the keyboard 100, from an external memory, or from another local or external location. In some embodiments, macro layers and/or macros as described herein may be configured to read data from a program, software, email, document, local memory, external memory, network entity, or similar location and copy the data to another location such as to a different document, local memory, external memory, network entity or similar location. In some embodiments, the macro layers and/or macros as described herein may be configured to insert text and/or apply a certain formatting to text. These features may beneficially allow a user to utilize the keyboard 100 for data entry or administrative purposes. Additionally, at least some of these features may beneficially allow a user to the utilize the keyboard 100 in industries or for purposes where the user needs to use phrases or similar phrases repeatedly.

In some embodiments, the macro layers and/or macros as described herein may be configured to edit and/or alter documents, photos, videos, audio files, or similar items. In some embodiments, the macro layers and/or macros as described herein may be configured to combine and/or separate files, documents, photos, videos, audio files, or similar items. Additionally, at least some of these features may beneficially allow a user to use the keyboard 100 for content creating purposes or for editing purposes.

In some embodiments, the macro layers and/or macros as described herein may be configured to filter and/or sort data. In some embodiments, the macro layers and/or macros as described herein may be configured to retrieve data may be retrieved from a local memory of the keyboard 100, In some embodiments, the macro layers and/or macros as described herein may be configured to create documents. In some embodiments, the macro layers and/or macros as described herein may be configured to sort data into rows and columns, such as into a spreadsheet.

In some embodiments, the macros layers and/or macros as described herein may be configured to interact with a software installed on a user device connected, either wirelessly or wired, to the keyboard 100, such as opening a software program, interacting with a feature of the software, or installing programs or software. In some embodiments, the macro layers and/or macros as described herein are configured to interact with and/or alter the settings of software being run by a user device or installed on the user device connected to the keyboard 100 and/or settings of the user device itself. In some embodiments, the macro layers and/or macros as described herein may be configured to install software on and/or remove software from a user device connected to the keyboard 100. In some embodiments, the macro layers and/or macros as described herein may be configured to interact with devices in communication with the keyboard 100. In some embodiments, the keyboard 100 may be in direct communication or indirect communication with a user device. In some embodiments, the keyboard 100 may be in communication with a device remotely. This beneficially allows a user to use the same macros and macro layers while connected either directly or remotely to different user devices.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A multifunctional keyboard, comprising:
 a platform;

a mode changing device comprising at least one mechanical actuator disposed on the platform, the at least one mechanical actuator configured to move between a first position and a second position, when the at least one mechanical actuator is in the first position the keyboard is in a macro configuration and when the at least one mechanical actuator is in the second position the keyboard is in a text input configuration, wherein the at least one mechanical actuator is a handle;

a first plurality of keys disposed on the platform, each of the first plurality of keys corresponding to a different macro layer when the keyboard is in the macro configuration; and a second plurality of keys disposed on the platform, each of the second plurality of keys corresponding to a different macro for each macro layer selected by the first plurality of keys when the keyboard is in the macro configuration, each of the second plurality of keys having a different function when the keyboard is in the text input configuration.

2. The multifunctional keyboard of claim 1, wherein the macro layer corresponding to at least one key of the first plurality of keys comprises a set of medical diagnostic descriptions.

3. The multifunctional keyboard of claim 2, wherein the macro corresponding to at least one key of the second plurality of keys comprises a medical diagnostic description associated with the set of medical diagnostic descriptions.

4. The multifunctional keyboard of claim 1, wherein the macro corresponding to at least one key of the second plurality of keys is configured to execute at least one of: install programs on a connected user device, change properties of the connected user device, or change program settings.

5. The multifunctional keyboard of claim 1, wherein the functionality of the first or second plurality of keys is programmable by a user, such that the function or value corresponding to each key within the first or second plurality of keys can be set by the user.

6. The multifunctional keyboard of claim 1, further comprising a third plurality of keys disposed on the platform, the third plurality of keys comprising system operational keys.

7. The multifunctional keyboard of claim 1, wherein each key of the first plurality of keys comprises a backlight.

8. The multifunctional keyboard of claim 7, wherein the backlight of each key of the first plurality of keys comprises a backlight of a different color than each other key of the first plurality of keys.

9. The multifunctional keyboard of claim 8, wherein the second plurality of keys are illuminated, an illumination color of the second plurality of keys corresponding to a color of the backlight of a selected key in the first plurality of keys.

10. The multifunctional keyboard of claim 1, wherein the function of at least a portion of the second plurality of keys corresponds to letter keys when the keyboard is in the text input configuration.

11. The multifunctional keyboard of claim 7, wherein the backlight of each key of the first plurality of keys comprises a first color when the keyboard is in the macro configuration and a second color when the keyboard is in the text input configuration.

12. A multifunctional keyboard, comprising:
a platform;
a pointing device disposed on the platform, the pointing device configured to move a cursor on a display electrically connected to the keyboard;

a first plurality of keys disposed on the platform, each of the first plurality of keys corresponding to a different macro layer;

a second plurality of keys disposed on the platform, each of the second plurality of keys corresponding to a different macro for each macro layer selected by the first plurality of keys when the keyboard is in a macro configuration, each of the second plurality of keys having a different function when the keyboard is in a text input configuration, wherein each key of the second plurality of keys comprises a backlight, and wherein the backlight of each key of the second plurality of keys comprises a first color when the keyboard is in the macro configuration and a second color when the keyboard is in the text input configuration; and a memory device within the platform configured to record position data, movement data, and interaction data of the cursor controlled by the pointing device.

13. The multifunctional keyboard of claim 12, wherein at least one key of the of the first, second, or third plurality of keys is configured to interact with the cursor causing the cursor to interact with the display connected to the keyboard.

14. The multifunctional keyboard of claim 12, wherein the pointing device comprises a mouse pad, a roller, or a joystick.

15. The multifunctional keyboard of claim 12, wherein at least one macro associated with a key of the second plurality of keys is associated with at least a portion of the position data, movement data, or interaction data stored within the memory device.

16. The multifunctional keyboard of claim 15, wherein the at least one macro associated with the key of the second plurality of keys is configured to cause the cursor to move or interact with a display connected to the keyboard in accordance with the position data, movement data, or interaction data associated with the at least one macro.

17. A multifunctional keyboard comprising:
a platform;
a mode-changing device configured to change the mode of the keyboard, wherein the mode-changing device comprises a handle, wherein when the handle is moved in a first direction the keyboard is in a macro mode, wherein when the handle is moved in a second direction the keyboard is in a text input mode;

a first plurality of keys disposed on the platform, each of the first plurality of keys corresponding to a different macro layer;

a second plurality of keys disposed on the platform, each of the second plurality of keys corresponding to a different macro for each macro layer selected by the first plurality of keys when the keyboard is in the macro mode, each of the second plurality of keys having a different function when the keyboard is in the text input mode; and a memory device stored within the platform, the memory device configured to store software related to the keyboard's functionality, wherein the software is configured allow a computer or other device connected to the keyboard to communicate with the keyboard without the software being installed on the computer or other device.

18. The multifunctional keyboard of claim 17, wherein the platform comprises a port, the port configured to receive an external memory device.

19. The multifunctional keyboard of claim 18, wherein the functionality of the first or second plurality of keys is configured to change based on the data stored on the external memory device when connected to the port of the platform.

20. The multifunctional keyboard of claim 17, wherein each key of the second plurality of keys comprises a backlight, the backlight of each key of the second plurality of keys comprises a first color when the keyboard is in the macro configuration and a second color when the keyboard is in the text input configuration.

* * * * *